US010042474B2

(12) United States Patent
Ye (10) Patent No.: US 10,042,474 B2
(45) Date of Patent: Aug. 7, 2018

(54) IN-CELL TOUCH CONTROL ASSEMBLY (71) Applicant: Shenzhen China Star Optoelectronics Technology Co., Ltd., Shenzhen, Guangdong (CN)

(72) Inventor: Chengliang Ye, Shenzhen (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 187 days.

(21) Appl. No.: 14/423,427

(22) PCT Filed: Feb. 8, 2015

(86) PCT No.: PCT/CN2015/072468
§ 371 (c)(1),
(2) Date: Feb. 23, 2015

(87) PCT Pub. No.: WO2016/078237
PCT Pub. Date: May 26, 2016

(65) Prior Publication Data
US 2016/0349914 A1 Dec. 1, 2016

(30) Foreign Application Priority Data
Nov. 20, 2014 (CN) .......................... 2014 1 0668352

(51) Int. Cl.
*G06F 3/041* (2006.01)
*G02F 1/1333* (2006.01)
(Continued)

(52) U.S. Cl.
CPC ........ *G06F 3/0418* (2013.01); *G02F 1/13338* (2013.01); *G02F 1/133514* (2013.01);
(Continued)

(58) Field of Classification Search
CPC ........... G02F 1/13338; G02F 1/133514; G02F 1/133516; G06F 2203/04103; G06F 3/041; G06F 3/0412; G06F 3/0418; G06F 3/044
See application file for complete search history.

(56) References Cited

U.S. PATENT DOCUMENTS

2010/0321327 A1* 12/2010 Liu ..................... G02F 1/13338
345/174
2011/0156996 A1* 6/2011 Izumi .................... G06F 3/0412
345/92
(Continued)

FOREIGN PATENT DOCUMENTS

CN    102650775 A    8/2012

OTHER PUBLICATIONS

Li Juan, Translation of CN103019447, Apr. 3, 2013.*

*Primary Examiner* — Dmitriy Bolotin
(74) *Attorney, Agent, or Firm* — Andrew C. Cheng (57) ABSTRACT

The present invention provides an In-Cell touch control assembly, comprising a color filter substrate (1), a color resist layer (3) located at an inner surface of the color filter substrate (1), and the color resist layer (3) comprises repeatedly arranged color resists of three colors, red, green, blue, (R, G, B) and one or two of the color resists of three colors, red, green, blue (R, G, B) are conductive photoresist, having conductive function to construct a single touch control driving electrode (Tx), or a single touch control sensing electrode (Rx), or a touch control driving electrode (Tx) and a touch control sensing electrode (Rx). The In-Cell touch control assembly can lessen the touch control assembly process, and incorporate in the present liquid crystal panel process to reduce the production cost and raise the market competitiveness. Meanwhile, it is more environmental pro-
(Continued)

tective than prior art of utilizing the metal black matrix as being the touch control electrode.

9 Claims, 8 Drawing Sheets

(51) Int. Cl.
    *G02F 1/1335*     (2006.01)
    *G06F 3/044*     (2006.01)

(52) U.S. Cl.
    CPC ........ *G02F 1/133516* (2013.01); *G06F 3/041* (2013.01); *G06F 3/044* (2013.01); *G06F 3/0412* (2013.01); *G06F 2203/04103* (2013.01)

(56) References Cited

U.S. PATENT DOCUMENTS

| | | | |
|---|---|---|---|
| 2012/0118606 A1* | 5/2012 | Kim | H01L 27/3288 174/126.1 |
| 2012/0194453 A1* | 8/2012 | Kim | G06F 3/0416 345/173 |
| 2012/0307185 A1* | 12/2012 | Wang | G02F 1/13338 349/106 |
| 2013/0044074 A1* | 2/2013 | Park | G02F 1/13338 345/174 |
| 2013/0307820 A1* | 11/2013 | Kim | G06F 3/044 345/174 |
| 2013/0335367 A1* | 12/2013 | Kim | G09G 3/3696 345/174 |
| 2014/0218053 A1* | 8/2014 | Ullmann | G06F 3/044 324/658 |
| 2014/0354909 A1* | 12/2014 | Dong | G02F 1/136286 349/42 |
| 2014/0368749 A1* | 12/2014 | Alonso | G02F 1/13338 349/12 |
| 2015/0293560 A1* | 10/2015 | Choi | G06F 3/0412 345/174 |
| 2015/0309644 A1* | 10/2015 | Sun | G06F 3/0412 345/173 |
| 2016/0259477 A1* | 9/2016 | Park | G06F 3/0412 |

\* cited by examiner

IN-CELL TOUCH CONTROL ASSEMBLY

FIELD OF THE INVENTION

The present invention relates to a display technology field, and more particularly to an In-Cell touch control assembly.

BACKGROUND OF THE INVENTION

With the development of display technology, the flat panel device, such as Liquid Crystal Display (LCD) possesses advantages of high image quality, power saving, thin body and wide application scope. Thus, it has been widely applied in various consumer electrical products, such as mobile phone, television, personal digital assistant, digital camera, notebook, laptop, and becomes the major display device.

Touch panel provides a new human machine interactive interface. The usage is more direct and with more humanization. Forming a touch control device with combining the touch panel and the flat display device is capable of providing the touch control function to the flat display device. With the fingers, the stylus for inputting, the operation can be more intuitive and easy.

At present, the liquid display panel and touch control panel have been widely applied and accepted, used by the people. Meanwhile, it has replaced the traditional CRTs and physical push button input devices.

The initial touch display devices generally utilize the independent type touch control screen, of which the touch control panel and the liquid crystal display panel are separately manufactured, and then combined with assembly. The touch display device obtained by this manufacture solution is thicker. With the additional glass, thin film, the transmission rate and the contrast of the liquid crystal panel obviously descend, either. Moreover, the manufacture cost is higher because of the separate manufacture. The market competitiveness goes down.

For solving the aforesaid problems, a thinner touch display device with better display effect and low cost is provided and the embedded touch control technology is born. The embedded touch control technology is to combine the touch control panel and the display panel as one, and to merge the function of the touch control panel into the liquid crystal panel to make the liquid crystal panel equipped with functions of display and sensing the touch control inputs at the same time.

Figure 1:
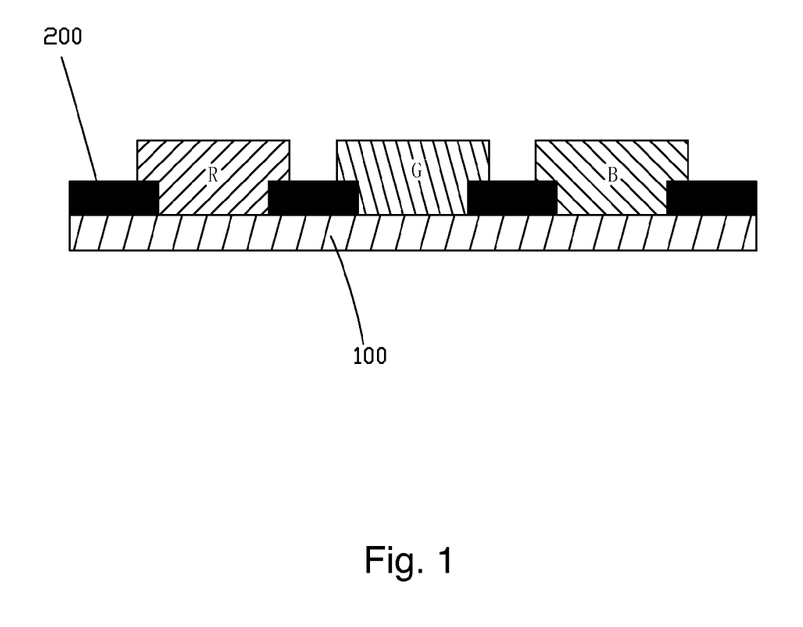
FIG. 1 is a diagram of constructing a touch control assembly with metal BM according to prior art.

The present embedded touch control technology mainly comprises two types: one is that the touch control circuit is on the liquid crystal cell (On Cell), and the other is that the touch control circuit is inside the liquid crystal cell (In Cell). The In Cell type can be further categorized as Pure in Cell and Hybrid In Cell. As shown in FIG. 1, in a present In Cell touch control display device, the red, green, blue color resists R, G, B and the Black Matrix 200 made of metal are located at the inner side of the Color Filter (CF) glass 100. The metal BM is employed as conductive material as being the touch control driving electrode (Transmit, Tx) or the touch control sensing electrode (Receive, Rx) which construct a part of the touch control assembly. The foregoing solution may solve the problems of thick separate type touch control screen, low transmission rate, low contrast and high cost. However, the metal BM contains cadmium and pollutes the environment. Because the BM is conductive, some negative influences happen to the Resistor-Capacitor loading (RC loading) of the entire panel and the BM seems to be gradually abandoned.

SUMMARY OF THE INVENTION

An objective of the present invention is to provide an In-Cell touch control assembly, which can lessen the touch control assembly process, and incorporate in the present liquid crystal panel process to reduce the production cost and raise the market competitiveness. Meanwhile, it is more environmental protective than prior art of utilizing the metal black matrix as being the touch control electrode.

For realizing the aforesaid objectives, the present invention provides an In-Cell touch control assembly, comprising a color filter substrate, a color resist layer located at an inner surface of the color filter substrate, and the color resist layer comprises repeatedly arranged color resists of three colors, red, green, blue, and one or two of the color resists of three colors, red, green, blue are conductive photoresist, having conductive function to construct a single touch control driving electrode, or a single touch control sensing electrode, or a touch control driving electrode and a touch control sensing electrode.

The one or two of the color resists of three colors, red, green, blue become conductive photoresist to realize the conductive function by mixing organic conductive compound.

The organic conductive compound is PEDOT.

The In-Cell touch control assembly is a hybrid in cell touch control assembly or a pure in cell touch control assembly.

The conductive photoresist constructs the touch control driving electrode and the touch control sensing electrode, and the touch control driving electrode and the touch control sensing electrode are alternately aligned for the pure in cell touch control assembly.

The conductive photoresist constructs the single touch control driving electrode, and the corresponding touch control sensing electrode is located at an outer surface of the color filter substrate for the hybrid in cell touch control assembly.

The conductive photoresist constructs the single touch control sensing electrode, and the corresponding touch control driving electrode is located at an outer surface of the color filter substrate for the hybrid in cell touch control assembly.

The red resist is the conductive photoresist, or the green resist is the conductive photoresist, or the blue resist is the conductive photoresist.

The red resist and the green resist are the conductive photoresist, or the red resist and the blue resist are the conductive photoresist, or the green resist and the blue resist are the conductive photoresist.

The benefits of the present invention are: the present invention provides an In-Cell touch control assembly, in which one or two of the color resists of three colors, red, green, blue become conductive photoresist to realize the conductive function by mixing organic conductive compound. With the conductive photoresist to be the touch control driving electrode, the touch control sensing electrode of the In-Cell touch control assembly, the touch control assembly process can be lessened and be incorporated in the present liquid crystal panel process to reduce the production cost and raise the market competitiveness. Meanwhile, it is environmental protective than prior art of utilizing the metal black matrix as being the touch control electrode.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

The present invention provides an In-Cell touch control assembly. Please refer to FIG. 2, which is the first embodiment of the In-Cell touch control assembly according to the present invention. The In-Cell touch control assembly comprises a color filter substrate 1, a color resist layer 3 located at an inner surface of the color filter substrate 1, and the color resist layer 3 comprises repeatedly arranged color resists of three colors, red, green, blue R, G, B. The inner surface of the color filter substrate 1 means the surface a side of the color filter substrate 1 close to the liquid crystal cell.

Figure 2:
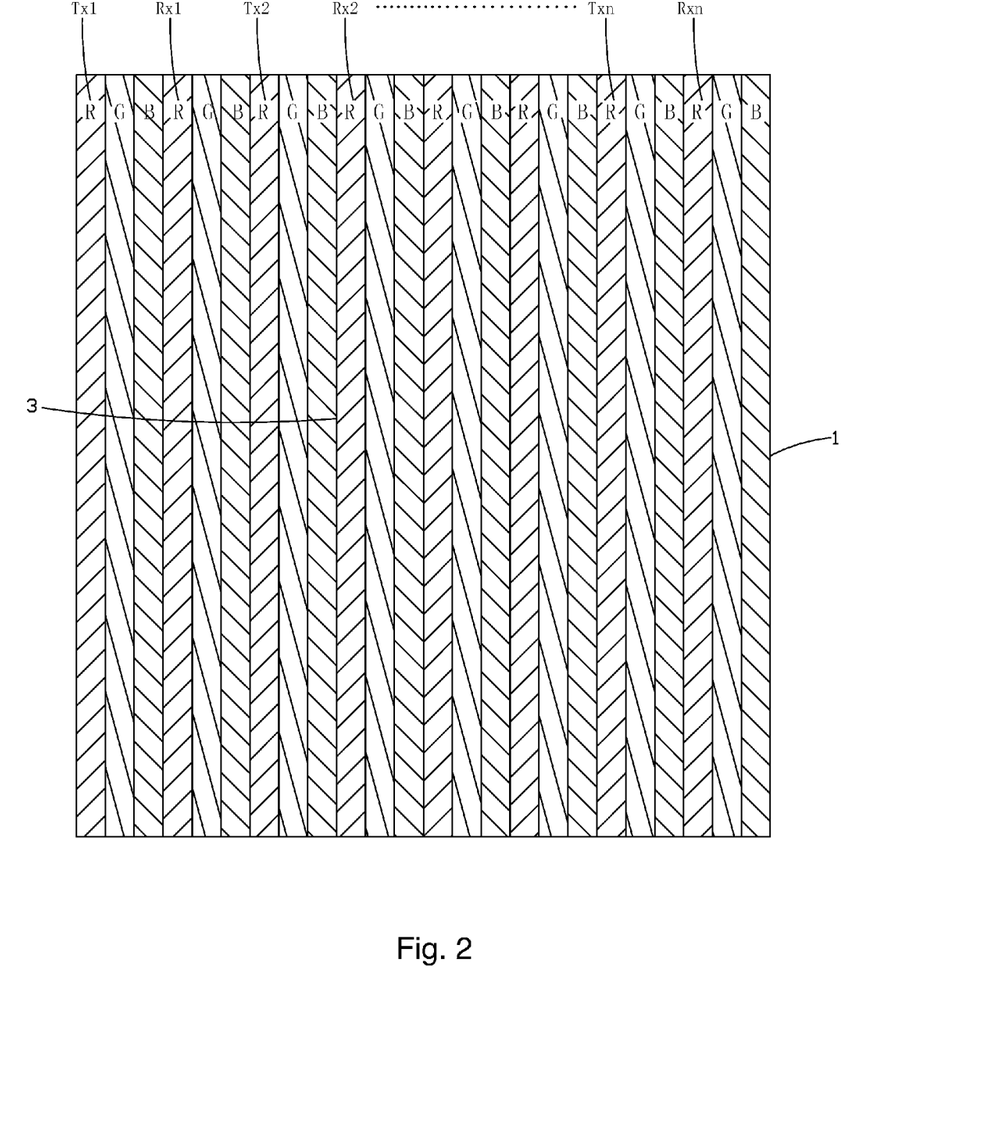
FIG. 2 is a diagram of an In-Cell touch control assembly according to the first embodiment of the present invention.
Figure 3:
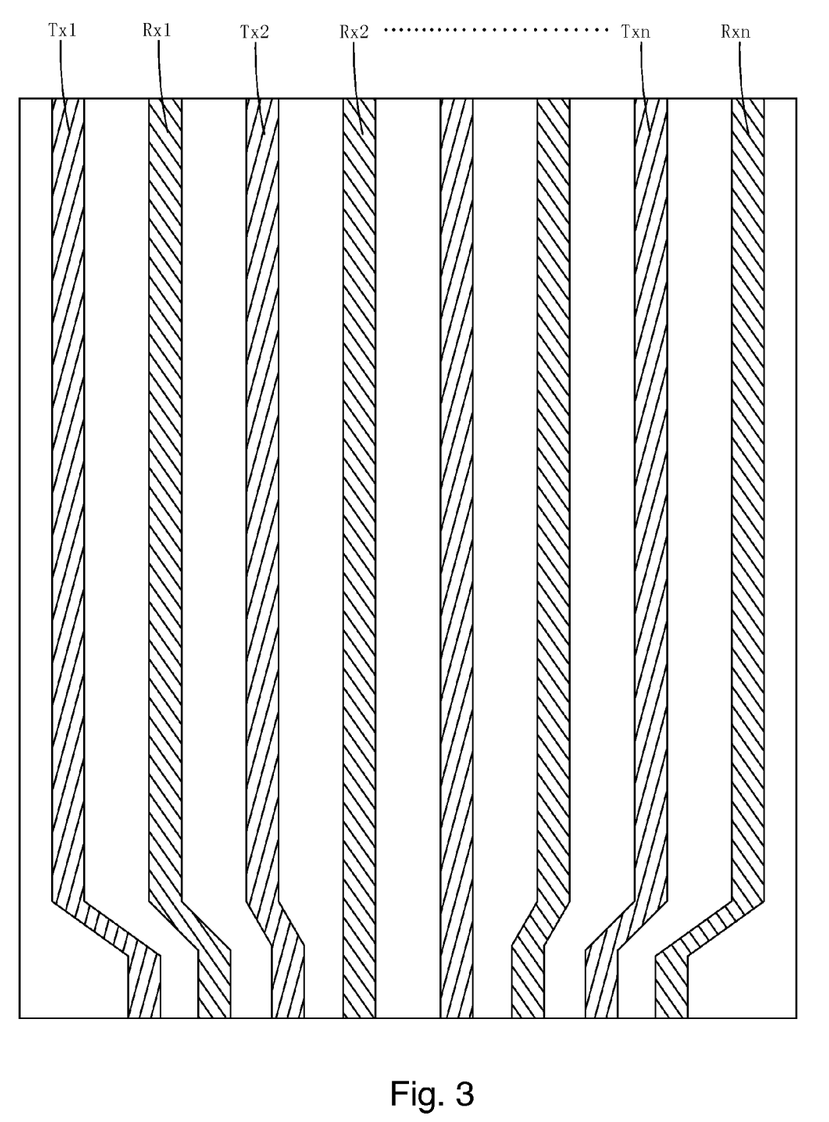
FIG. 3 is an equivalent circuit diagram corresponding to FIG. 2.

The red resist R becomes the conductive photoresist to realize the conductive function by mixing organic conductive compound and to construct a touch control driving electrode Tx and a touch control sensing electrode Rx. The touch control driving electrode Tx and the touch control sensing electrode Rx are alternately aligned. The first column red resist R construct a first column touch control driving electrode Tx1, and the second column red resist R construct a first column touch control sensing electrode Rx1, and the third column red resist R construct a second column touch control driving electrode Tx2, and the fourth column red resist R construct a second column touch control sensing electrode Rx2, and so on. FIG. 3 is an equivalent circuit diagram corresponding to FIG. 2. Similarly, it shows that the touch control driving electrode Tx and the touch control sensing electrode Rx are alternately aligned.

In the first embodiment, both the touch control driving electrode Tx and the touch control sensing electrode Rx are located at the inner surface of the color filter substrate 1, which is a pure in cell touch control assembly. Specifically, the organic conductive compound are Poly(3,4-ethylenedioxythiophene) (PEDOT), and PEDOT is the polymer of 3,4-ethylenedioxythiophene (EDOT) monomer, which possesses properties of simple molecular structure, small energy gap, high conductivity. The red resist R becomes the conductive photoresist to realize the conductive function by mixing PEDOT.

In the first embodiment, only the red resist R is illustrated to be the conductive photoresist. Similarly, the green resist G can be the conductive photoresist, or the blue resist B can be the conductive photoresist. That is, the color resist of the same color becomes the conductive photoresist and constructs the touch control driving electrode Tx and the touch control sensing electrode Rx; furthermore, the red resist R and the green resist G can be the conductive photoresist, or the red resist R and the blue resist B can be the conductive photoresist, or the green resist G and the blue resist B can be the conductive photoresist. That is, the color resists of two colors become the conductive photoresist, and one constructs the touch control driving electrode Tx and the other constructs the touch control sensing electrode Rx.

Figure 4:
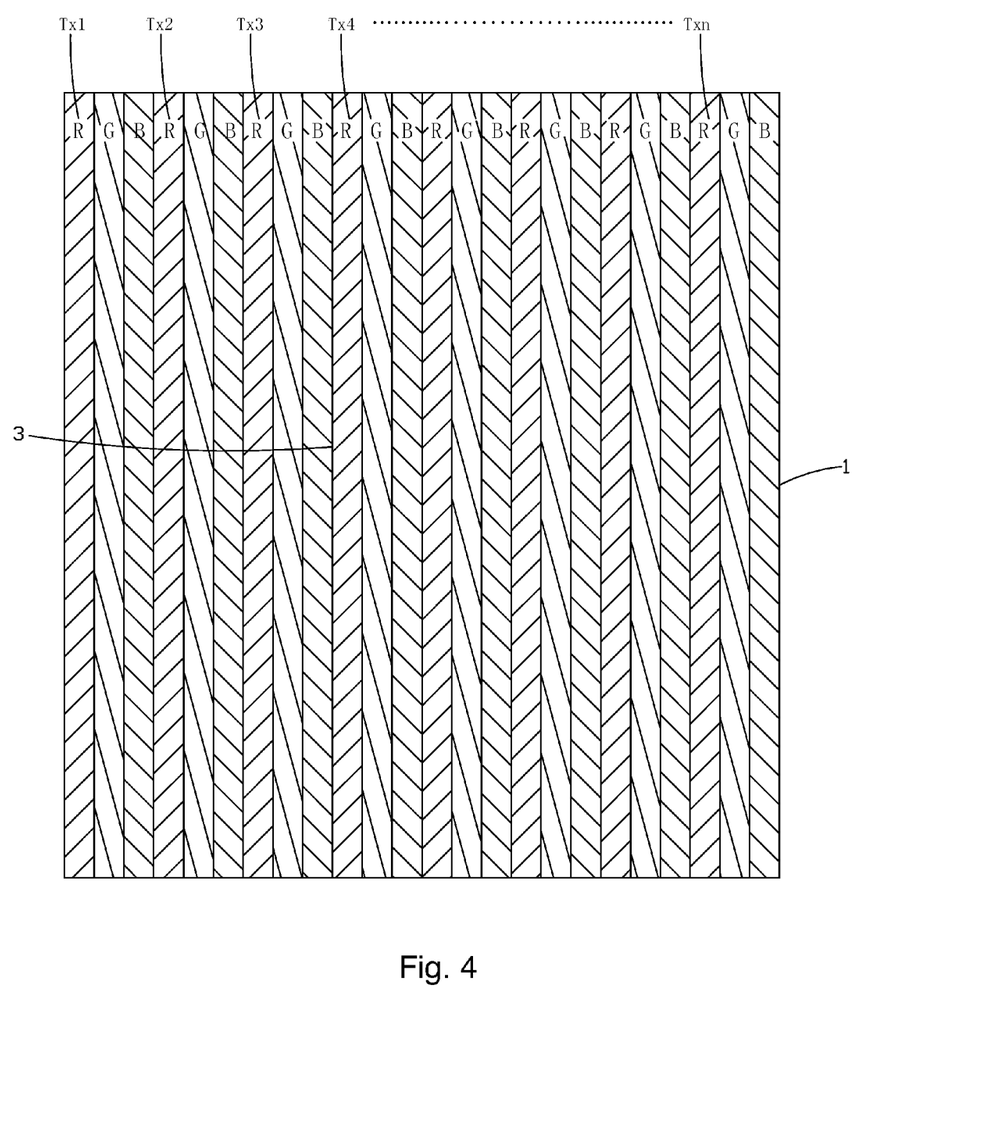
FIG. 4 is a diagram of an In-Cell touch control assembly according to the second embodiment of the present invention.

Please refer to FIG. 4, which is the second embodiment of the In-Cell touch control assembly according to the present invention. The In-Cell touch control assembly comprises a color filter substrate 1, a color resist layer 3 located at an inner surface of the color filter substrate 1, and the color resist layer 3 comprises repeatedly arranged color resists of three colors, red, green, blue R, G, B. The inner surface of the color filter substrate 1 means the surface a side of the color filter substrate 1 close to the liquid crystal cell.

Figure 5:
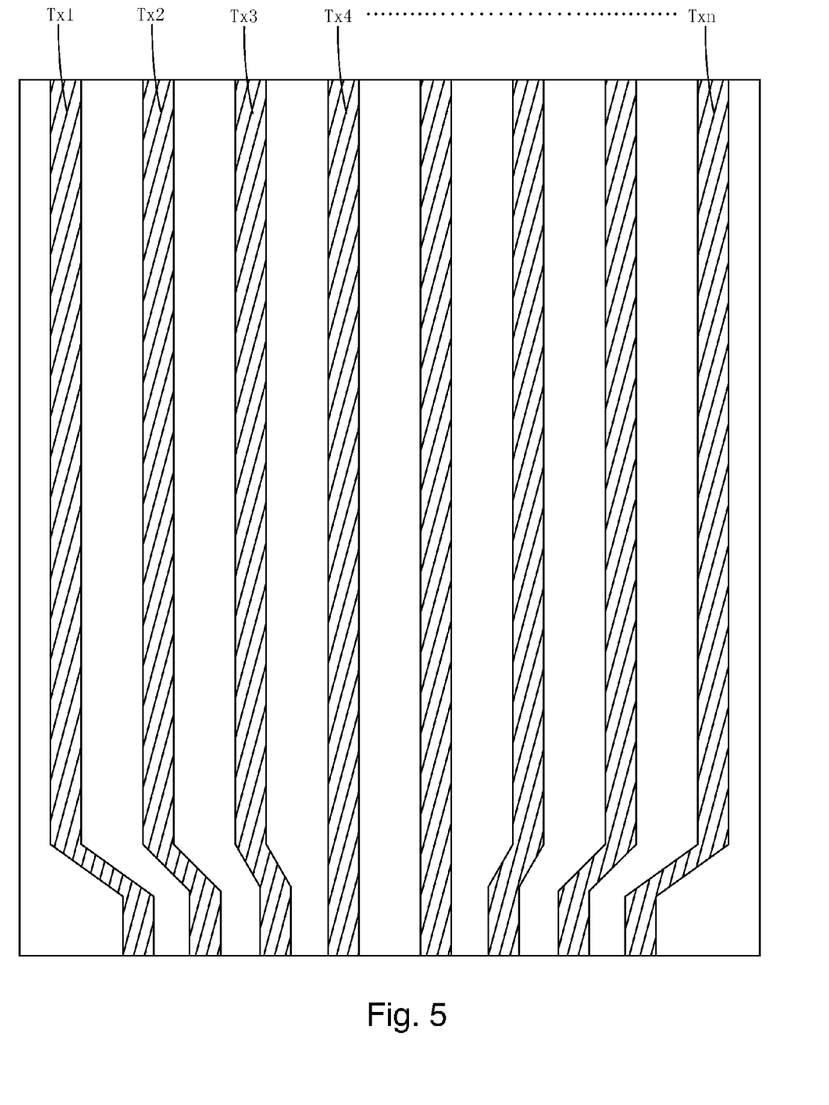
FIG. 5 is an equivalent circuit diagram corresponding to FIG. 4.

The red resist R becomes the conductive photoresist to realize the conductive function by mixing organic conductive compound and to construct a single touch control driving electrode Tx. The corresponding touch control sensing electrode is located at an outer surface of the color filter substrate 1. As shown in FIG. 4, the first column red resist R construct a first column touch control driving electrode Tx1, and the second column red resist R construct a second column touch control driving electrode Tx2, and the third column red resist R construct a third column touch control driving electrode Tx3, and the fourth column red resist R construct a fourth column touch control driving electrode Tx4, and so on. FIG. 5 is an equivalent circuit diagram corresponding to FIG. 4. Similarly, it shows that the single touch control driving electrodes Tx are sequentially aligned.

In the second embodiment, the touch control driving electrode Tx is located at the inner surface of the color filter substrate 1 and the corresponding touch control sensing electrode is located at an outer surface of the color filter substrate 1, which is a hybrid in cell touch control assembly. Specifically, the organic conductive compound are Poly(3, 4-ethylenedioxythiophene) (PEDOT), and PEDOT is the polymer of 3,4-ethylenedioxythiophene (EDOT) monomer, which possesses properties of simple molecular structure, small energy gap, high conductivity. The red resist R becomes the conductive photoresist to realize the conductive function by mixing PEDOT.

In the second embodiment, only the red resist R is illustrated to be the conductive photoresist. Similarly, the green resist G can be the conductive photoresist, or the blue resist B can be the conductive photoresist. That is, the color resist of the same color becomes the conductive photoresist and constructs the single touch control driving electrode Tx; furthermore, the red resist R and the green resist G can be the conductive photoresist, or the red resist R and the blue resist B can be the conductive photoresist, or the green resist G and the blue resist B can be the conductive photoresist.

That is, the color resists of two colors become the conductive photoresist, and one constructs the single touch control driving electrode Tx.

Figure 6:
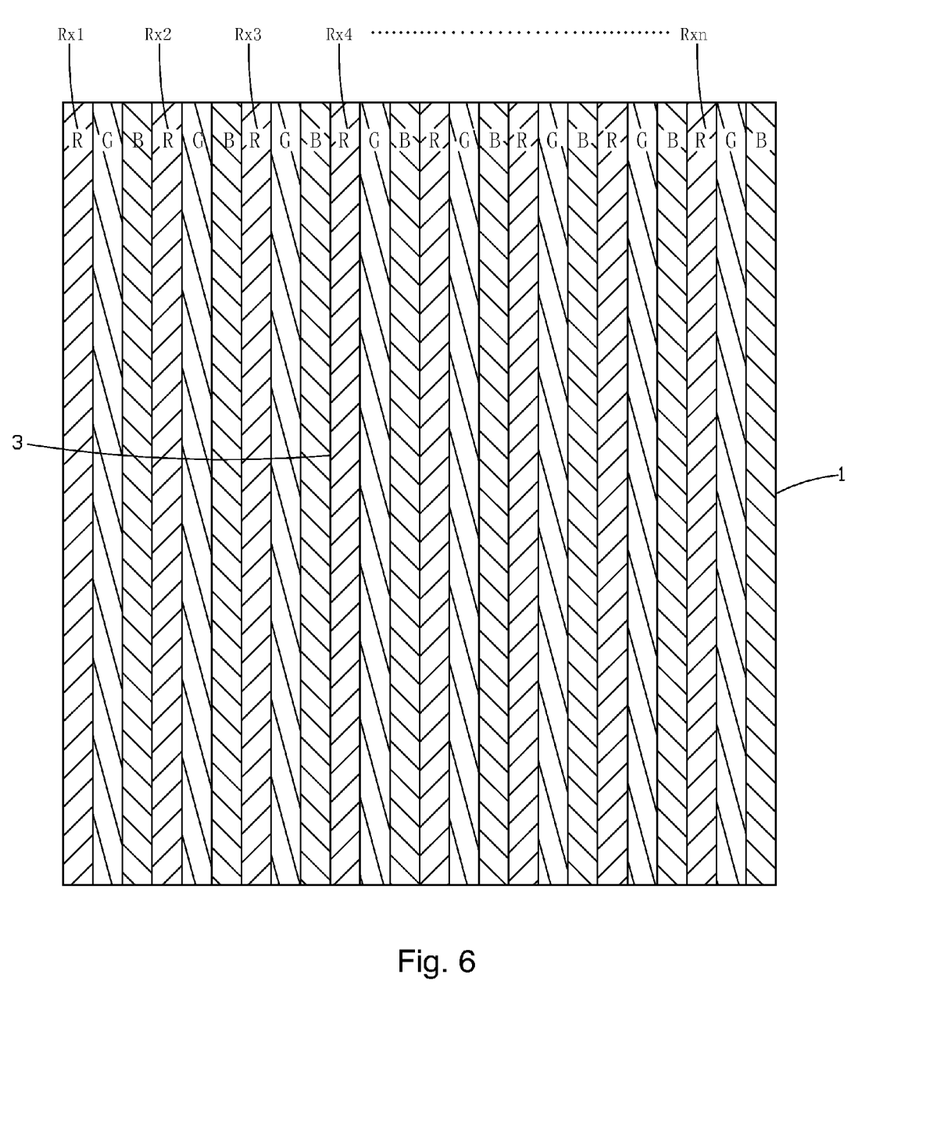
FIG. 6 is a diagram of an In-Cell touch control assembly according to the third embodiment of the present invention.
Figure 7:
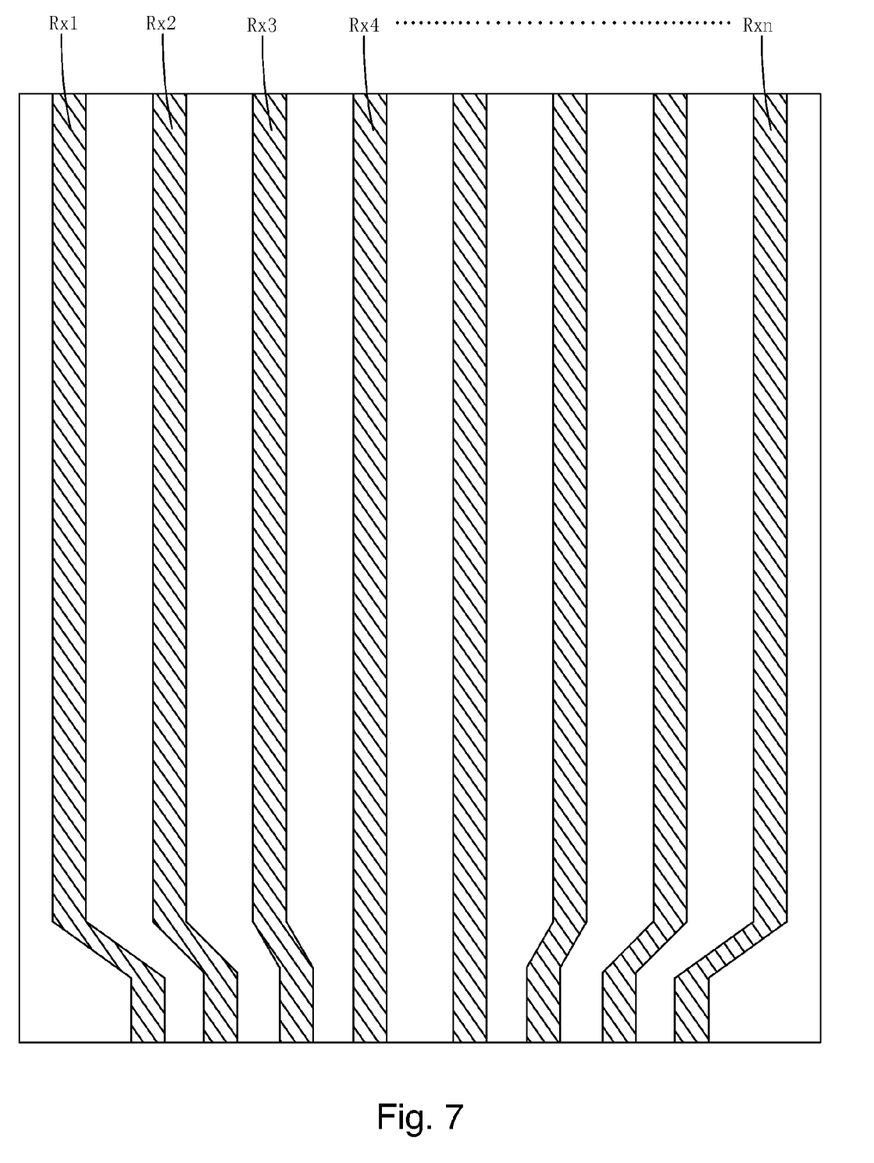
FIG. 7 is an equivalent circuit diagram corresponding to FIG. 6.

Please refer to FIG. 6, which is the third embodiment of the In-Cell touch control assembly according to the present invention. The difference between the third embodiment and the second embodiment is, the red resist R becomes the conductive photoresist to realize the conductive function by mixing organic conductive compound and to construct a single touch control sensing electrode Rx. The corresponding touch control driving electrode is located at an outer surface of the color filter substrate 1. As shown in FIG. 6, the first column red resist R construct a first column touch control sensing electrode Rx1, and the second column red resist R construct a second column touch control sensing electrode Rx2, and the third column red resist R construct a third column touch control sensing electrode Rx3, and the fourth column red resist R construct a fourth column touch control sensing electrode Rx4, and so on. FIG. 7 is an equivalent circuit diagram corresponding to FIG. 6. Similarly, it shows that the single touch control sensing electrodes Rx are sequentially aligned. Others are the same as the second embodiment. The repeated description is omitted here.

Figure 8:
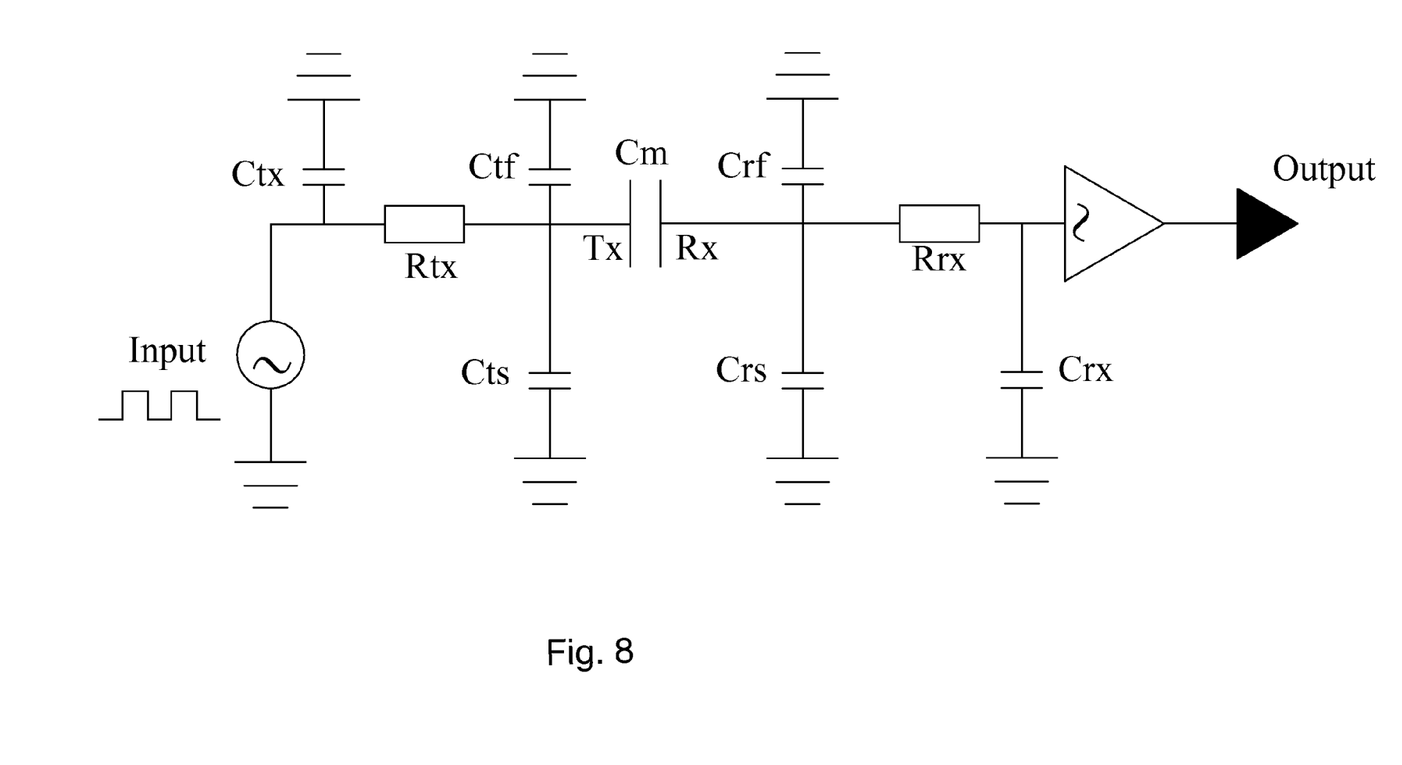
FIG. 8 is an equivalent principle diagram of the In-Cell touch control assembly according to the present invention.

Please refer to FIG. 8, which is an equivalent principle diagram of the In-Cell touch control assembly according to the present invention. The In-Cell touch control assembly is divided into driving part and sensing part. The driving part is electrically coupled to a driving pulse input end (Input), and comprises capacitor Ctx, a resistor Rtx, a capacitor Ctf, a capacitor Cts interconnecting with one another; the sensing part is electrically coupled to an output end (Output), and comprises a capacitor Crf, a capacitor Crs, a resistor Rrx, a capacitor Crx. The driving part is employed to provide driving voltages, and the sensing part is employed to receive sensing signals to confirm whether touch exists or not. When the touch motion exists, the coupling capacitor Cm between the touch control driving electrode Tx and the touch control sensing electrode Rx changes, and the output end (Output) confirms the touch position according to the variation of the coupling capacitor Cm and outputs corresponding output signals.

In conclusion, in the In-Cell touch control assembly of the present invention, one or two of the color resists of three colors, red, green, blue become conductive photoresist to realize the conductive function by mixing organic conductive compound. With the conductive photoresist to be the touch control driving electrode, the touch control sensing electrode of the In-Cell touch control assembly, the touch control assembly process can be lessened and be incorporated in the present liquid crystal panel process to reduce the production cost and raise the market competitiveness. Meanwhile, it is environmental protective than prior art of utilizing the metal black matrix as being the touch control electrode.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. An In-Cell touch control assembly, comprising a color filter substrate, a color resist layer located at an inner surface of the color filter substrate that is adapted to locate adjacent to a liquid crystal cell, wherein the color resist layer comprises repeatedly arranged color resists of three colors, red, green, blue, and one or two of the color resists of three colors, red, green, blue are conductive photoresist, having conductive function to construct a touch control driving electrode and a touch control sensing electrode of a pure in-cell touch control assembly;

wherein for the pure in-cell touch control assembly, the touch control driving electrode and the touch control sensing electrode are formed of the conductive photoresist of the color resists of three colors, red, green, blue and are alternately arranged on the inner surface of the color filter substrate and substantially parallel to each other, wherein the color resist layer includes the touch control driving electrode and the touch control sensing electrode to provide an additional function of touch control; and wherein the color resists of three colors of red, green, and blue are arranged side by side in a predetermined direction, wherein the one or two of the color resists of three colors that construct the touch control driving electrode comprise multiple portions that are arranged in a first arrangement direction identical to the predetermined direction; and the one or two of the color resists of three colors that construct the touch control sensing electrode comprise multiple portions that are arranged in a second arrangement direction identical to the predetermined direction, the first arrangement direction and the second arrangement direction being parallel to each other.

2. The In-Cell touch control assembly according to claim 1, wherein the one or two of the color resists of three colors, red, green, blue become conductive photoresist to realize the conductive function by mixing organic conductive compound.

3. The In-Cell touch control assembly according to claim 2, wherein the organic conductive compound is PEDOT.

4. The In-Cell touch control assembly according to claim 1, wherein the red resist is the conductive photoresist, or the green resist is the conductive photoresist, or the blue resist is the conductive photoresist.

5. The In-Cell touch control assembly according to claim 1, wherein the red resist and the green resist are the conductive photoresist, or the red resist and the blue resist are the conductive photoresist, or the green resist and the blue resist are the conductive photoresist.

6. An In-Cell touch control assembly, comprising a color filter substrate, a color resist layer located at an inner surface of the color filter substrate that is adapted to locate adjacent to a liquid crystal cell, wherein the color resist layer comprises repeatedly arranged color resists of three colors, red, green, blue, and one or two of the color resists of three colors, red, green, blue are conductive photoresist, having conductive function to construct a single touch control driving electrode or a single touch control sensing electrode of a hybrid in-cell touch control assembly, or to alternatively construct a touch control driving electrode and a touch control sensing electrode of a pure in-cell touch control assembly;

wherein the one or two of the color resists of three colors, red, green, blue become conductive photoresist to realize the conductive function by mixing organic conductive compound;

wherein for the pure in-cell touch control assembly, the touch control driving electrode and the touch control sensing electrode are formed of the conductive photoresist of the color resists of three colors, red, green, blue and are alternately arranged on the inner surface of the color filter substrate and substantially parallel to each other, wherein the color resist layer includes the touch control driving electrode and the touch control sensing electrode to provide an additional function of touch control; and wherein the color resists of three colors of red, green, and blue are arranged side by side in a predetermined direction, wherein the one or two of the color resists of three colors that construct the touch control driving electrode comprise multiple portions that are arranged in a first arrangement direction identical to the predetermined direction; and the one or two of the color resists of three colors that construct the touch control sensing electrode comprise multiple portions that are arranged in a second arrangement direction identical to the predetermined direction, the first arrangement direction and the second arrangement direction being parallel to each other.

7. The In-Cell touch control assembly according to claim 6, wherein the organic conductive compound is PEDOT.

8. The In-Cell touch control assembly according to claim 6, wherein the red resist is the conductive photoresist, or the green resist is the conductive photoresist, or the blue resist is the conductive photoresist.

9. The In-Cell touch control assembly according to claim 6, wherein the red resist and the green resist are the conductive photoresist, or the red resist and the blue resist are the conductive photoresist, or the green resist and the blue resist are the conductive photoresist.

\* \* \* \* \*